United States Patent [19]

Kawamura

[11] Patent Number: 4,837,596
[45] Date of Patent: Jun. 6, 1989

[54] INFORMATION SET DEVICE FOR CAMERA

[75] Inventor: Masaharu Kawamura, Kawasaki, Japan

[73] Assignee: Canon Kabushiki Kaisha, Tokyo, Japan

[21] Appl. No.: 79,134

[22] Filed: Jul. 29, 1987

[30] Foreign Application Priority Data

Aug. 1, 1986 [JP] Japan .................................. 179855
Apr. 14, 1987 [JP] Japan .................................. 62-4969

[51] Int. Cl.⁴ ...................... G03B 7/097; G03B 17/00; G03B 17/08
[52] U.S. Cl. .................................. 354/442; 354/289.1
[58] Field of Search ............... 354/441, 442, 202, 288, 354/289.1, 289.11, 289.12

[56] References Cited

U.S. PATENT DOCUMENTS

| 4,175,842 | 11/1979 | Sakurada et al. | 354/442 |
| 4,420,237 | 12/1983 | Ogawa et al. | 354/458 |
| 4,647,176 | 3/1987 | Shimizu et al. | 354/289.1 |
| 4,699,492 | 10/1987 | Iwashita et al. | 354/289.1 |

FOREIGN PATENT DOCUMENTS

112724  7/1982  Japan .................................. 354/289.1

Primary Examiner—W. B. Perkey
Attorney, Agent, or Firm—Fitzpatrick, Cella, Harper & Scinto

[57] ABSTRACT

An information set device for a camera, in which time value and aperture value information can be set by operating a single information setting operation member in a manual mode. When the information setting operation member is simply operated during the manual mode, one of the time value and aperture value information is set. When the information setting operation member is operated in an operation state of a second operation member, the other information is set.

9 Claims, 7 Drawing Sheets

INFORMATION SET DEVICE FOR CAMERA

BACKGROUND OF THE INVENTION

1. Field of the Invention

The present invention relates to an improvement in an exposure information set device for a camera including a dialling information set means used for setting time value information and aperture value information.

2. Related Background Art

In order to manually set an aperture of a lens, an aperture ring is conventionally arranged in the lens, thereby posing no problem. However, since an automatic focusing lens has been recently developed, a camera in which the aperture ring is not provided in terms of a space and cost and an aperture is controlled from a camera main body similar to automatic exposure has been widely used.

In a camera of this type, when an exposure mode is shutter-priority or aperture-priority, a present content of a higher priority side can be changed by a single operation member. However, when a manual exposure mode is selected, two operation members (for a shutter and an aperture) are required to set time value information and aperture value information. In this case, the above two operation members can be provided to a camera main body, and a camera of this type is available on the market. However, a camera of this type has space and design problems and is not satisfactory in operability. That is, these pieces of information can be most easily set by a dialling set method at present, but it is almost impossible to provide two dials in a camera for satisfactory utilization of space and to provide a satisfactory design. For this reason, two see-saw switches and the like, which are more or less disadvantageous in operability, are provided.

SUMMARY OF THE INVENTION

One aspect of the application is to provide an information set device for a camera, in which during information setting in a manual mode, a time value and an aperture value can be set by operating a single information setting member.

One aspect of the application is to provide an information set device for a camera, in which during information setting in a manual mode, when a single information setting member is operated in an operative state of a first operation member, one of shutter information and aperture information is set by operating the information setting member, and when the single information setting member is operated in an inoperative state of the first operation member, the other information is set.

One aspect of the application is to provide an information set device for a camera, in which when information is set in a mode other than the manual mode by the single information setting member and the set information is of low setting frequency, an operation member for setting the information is housed in a housing portion, and the operation member is operated only after a cover of the housing portion is open, thereby preventing erroneous setting of the information of low setting frequency, and when the operation member is once operated, the information of low setting frequency can be set only by operating the setting member without holding the operation member in an operative state, and a set mode of the information of low setting frequency is reset by operating another operation member, thereby improving operability with respect to setting of the information of low setting frequency.

Other aspects of the present invention will be more apparent from an embodiment to be described below with reference to the accompanying drawings.

DETAILED DESCRIPTION OF THE PREFERRED EMBODIMENTS

Figure 1:
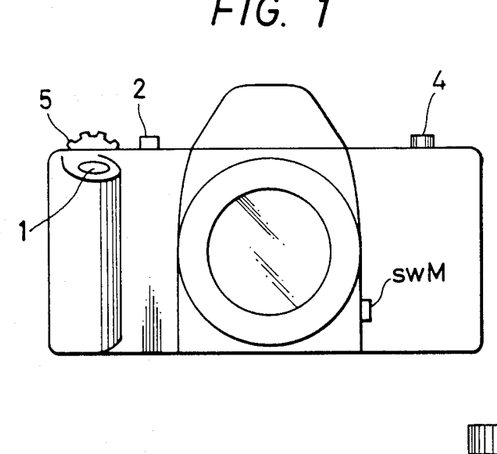
FIG. 1 shows a front view of one embodiment of a camera having an auto-bracket device of the present invention.
Figure 2:
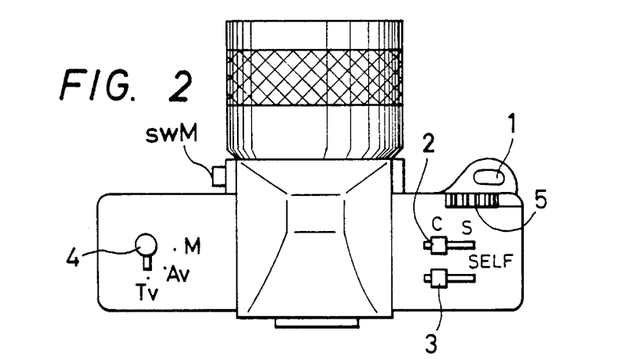
FIG. 2 shows a top view of the camera of FIG. 1.
Figure 3:
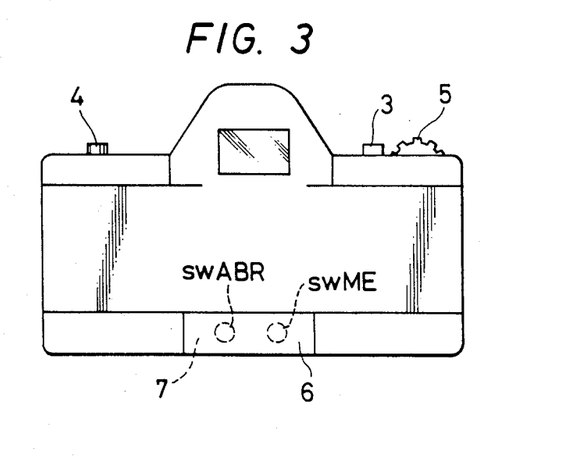
FIG. 3 shows a rear view of the camera of FIG. 1.

FIG. 1 shows a front view of a camera having an auto-bracket device of the present invention, FIG. 2 shows a top view thereof, and FIG. 3 shows a rear view thereof. In FIGS. 1-3, numeral 1 denotes a shutter release button, numeral 2 denotes a selection lever for selecting a continuous photographing mode (C) or a single photographing mode (S), numeral 3 denotes a self-timer actuation lever, numeral 4 denotes an exposure mode selection knob for selecting a shutter preferential mode (Tv), an aperture preferential mode (Av) or a manual mode (M), and numeral 5 denotes a dial which is used to set shutter speed, stop value or exposure information in the auto-bracket mode photographing (for example, information for each 0.5 step or 1 step) and which comprises a switch having a 2-bit conductive pattern and a brush having a 90 phase difference therebetween. As the dial is rotated, a pulse is produced and a signal for indicating a direction of counting of the pulse is produced. Symbol swM denotes a stop value setting switch. The stop value may be altered by manipulating the dial 5 while the switch swM is depressed in a manual exposure mode. Numeral 6 denotes a cover of a housing 7 in which less frequently used switches are accommodated, swABR denotes an auto-bracket switch accommodated in the housing 7, and swME denotes a multi-exposure switch accommodated in the housing 7.

Figure 4:
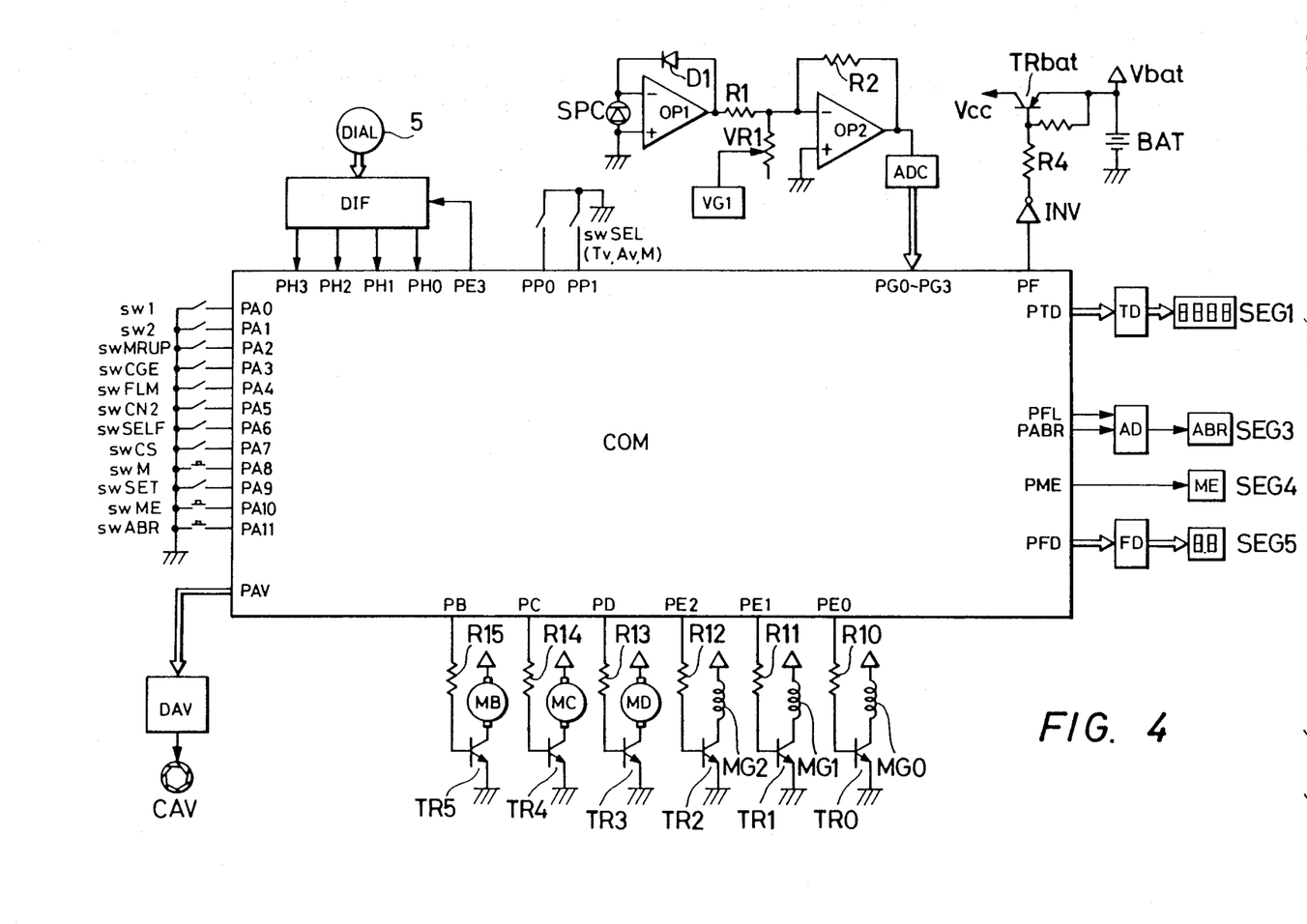
FIG. 4 shows a circuit diagram of one embodiment of the camera of FIG. 1, and FIGS. 5 to 8 show program flow charts of programs stored in a computer COM shown in FIG. 4.

FIG. 4 shows a circuit diagram of one embodiment of a camera circuits shown in FIG. 1.

A photo-sensor SPC senses a light reflected by an object and sends an electrical signal to a high input impedance operational amplifier OP1 having a compression diode D1 connected to a feedback circuit. The operational amplifier OP1 produces a logarithmically compressed object brightness information Bv through a resistor R1. A potentiometer VR1 connected to a constant voltage source VG1 bears film sensitivity information Sv.

An operational amplifier OP2 having a resistor R2 connected to a feedback circuit calculates light information $Ev=(Bv+Sv)$, which is converted to a 4-bit digital value by an A/D converter ADC, and the digital signal is supplied to input ports PG0–PG3 of a microcomputer COM.

As the dial 5 is manipulated, the number of pulses corresponding to the number of clicks (displacement) is counted by a counter in a dial interface circuit DIF, and the count is converted to 4-bit information, which is applied to input ports PH0–PG3 of the microcomputer COM. The counter information in the dial interface circuit DIF is reset when a pulse signal is supplied from an output port PE3 of the microcomputer COM. Depending on a mode selected by the exposure mode selection knob 4, the exposure mode switch swSE is turned on or off and the two-bit information corresponding to the selected exposure mode is applied to input ports PP0-PP1 of the microcomputer COM.

When a battery BAT is loaded to the camera, a power supply $V_{bat}$ is supplied to the microcomputer COM, decoders TD, AD and FD of a display system and the dial interface circuit DIF. When a first stroke switch sw1 connected to the input port PA0 is turned on by a first stroke of the shutter release button 1, a potential of the output port PF goes high level and a transistor $TR_{bat}$ is turned on by an inverter INV and a resistor R3 so that a voltage of the power supply $V_{bat}$ is supplied, as Vcc, to relatively high power consumption circuits such as operational amplifiers OP1 and OP2.

Connected to input ports PA1-PA11 of the microcomputer COM are a second stroke switch sw2 which is turned on by a second stroke of the shutter release button 1, a mirror up switch swMRUP which is turned off when a mirror is turned up and turned on when a mirror is turned down, an end of charge detection switch swCGE which is turned on when mechanical charge is completed, a film switch swFLM which is turned on each time one frame of film has been fed, a trailing curtain switch swCN2 which is turned on at the end of run of a trailing curtain, a self-timer switch swSELF which is turned on when the self-timer is set by the lever 3. A switch swCS which is turned on when the continuous photographing mode is selected by the lever 2 and turned off when the single photographing mode is selected, the stop value setting switch swM, a switch swSET which is turned off when the switch cover 6 is in a closed position and turned on when it is in an open position, the multi-photographing switch swME, and the auto-bracket switch swABR, respectively.

Bases of transistors TR0-TR2 are connected to output ports PE0-PE2 through resistors R10-R12, and the transistors TR0-TR2 control energizations of a first magnet MG0, a leading curtain magnet for driving a leading curtain and a trailing curtain magnet MG2 for driving the trailing curtain. Bases of transistors TR3-TR5 are connected to output ports PD, PC and PB through resistors R13-R15. The transistor TR3 controls the drive of a charging motor MD, the transistor TR4 controls the drive of a rewinding motor MC, and the transistor TR5 controls the drive of a take-up motor MB which takes up the film at a high speed.

An output port PTD supplies a content of a shutter speed information register RGTv in the microcomputer COM to a decoder TD, and the content of the decoder TD is converted to a shutter speed display signal, which is supplied to a display SEG1 such as a liquid crystal display.

Output ports PEL and PABR supply "1" (high level) or "0" (low level) signals to a decoder AD. When the decoder AD receives the "1" signal from the output port PEL, it provides an auto-bracket mark flashing signal to a display SEG3 such as a liquid crystal display. When the decoder AD receives the "1" signal from the output port PABR, it provides an auto-bracket mark display signal to the display SEG2.

An output port PME supplies a "1" or "0" signal to a display SEG4 such as a liquid crystal display, which displays a multi-photographing mark when it receives the "1" signal.

An output port PFD supplies to a decoder FD a content of the stop value information register RGAv in the microcomputer COM, a content of an auto-bracket step information register RGBR or a content of a multiple-frame count information register RGME. The decoder FD supplies a numeric display signal corresponding to the received content to a display SEG5 such as a liquid crystal display.

An output port PAV supplies a content of the stop value information register in the microcomputer COM to a diaphragm control drive circuit DAV, which converts it to actual diaphragm information and supplies it to a drive actuator CAV such as a stepping motor to control the diaphragm.

Figure 51:
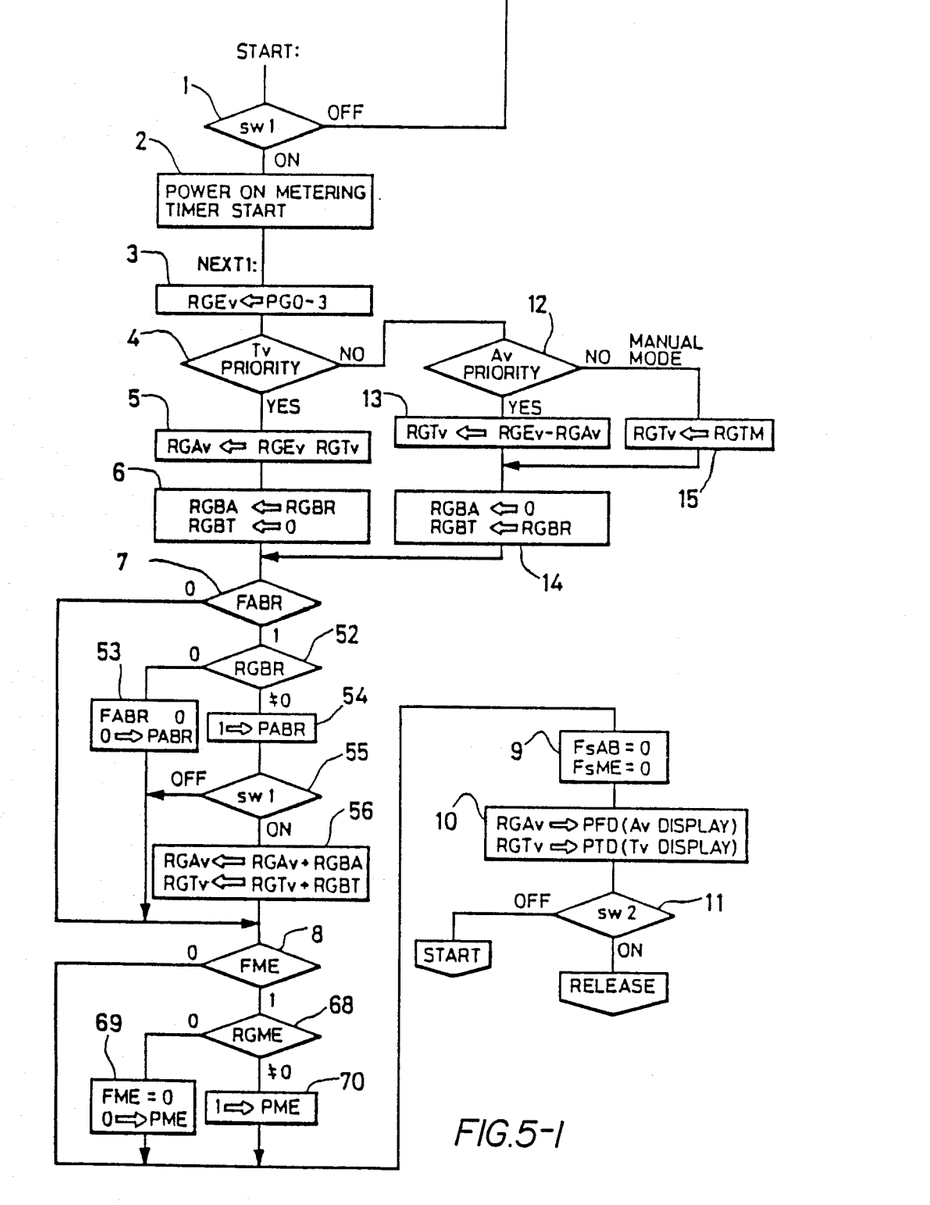
Figure 52:
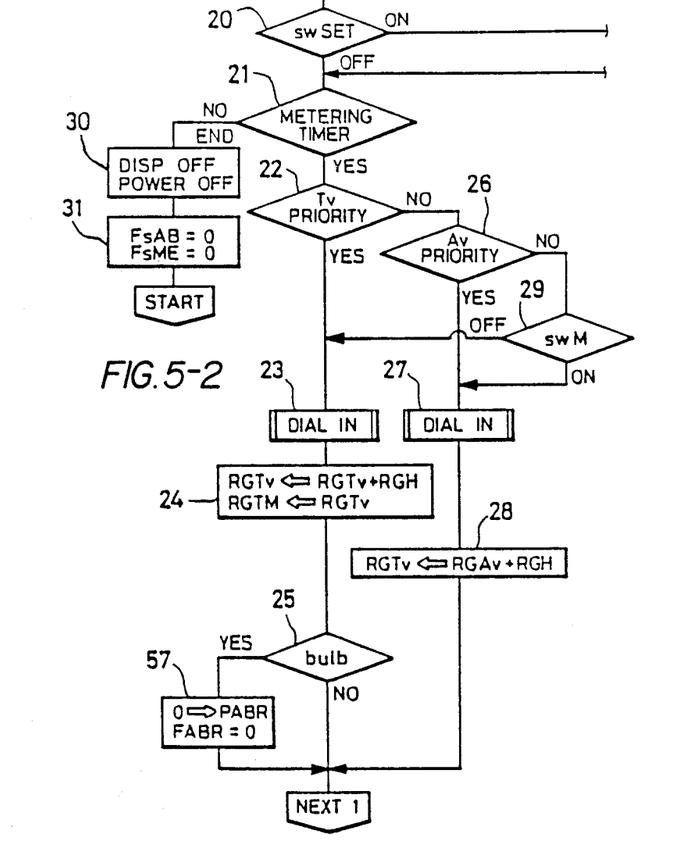
Figure 53:
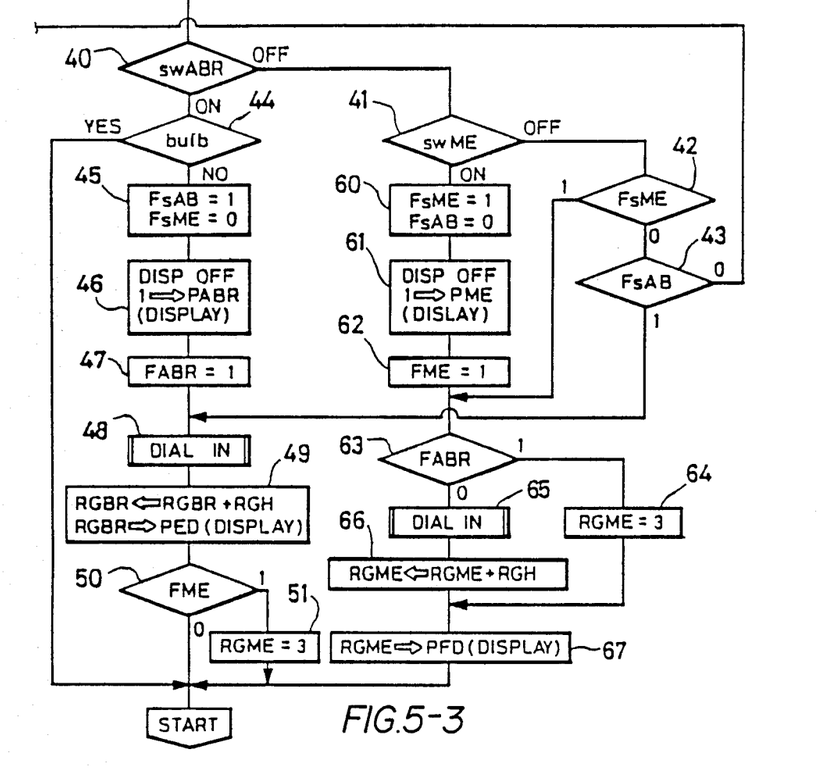

The operation of the microcomputer COM is explained with reference to FIGS. 5-1 and 5-2 and 6.

When the battery BAT is loaded to the camera and the power supply $V_{bat}$ is established, the microcomputer COM starts the operation from a start point in a flow chart of FIGS. 5-1 and 5-2. [Step 1] If the operator depresses only the first stroke of the shutter release button 1, the on signal of the first stroke switch sw1 is supplied to the input port PA0 and the process proceeds to a step 2. [Step 2] The output port PF produces a "1" signal to turn on the transistor $TR_{bat}$ to supply the power supply Vcc to the elements of FIG. 4. Then, the light measurement timer is started. The light measurement timer serves to keep the supply of the power supply Vcc for a predetermined period after the application of the off signal from the first stroke switch sw1. By the function of the timer, the operator can identify the light measurement for the predetermined period after he/she has released the shutter release button 1 so that he/she can change the setting while watching the display selected by the exposure mode selection knob 4. The light measurement timer is constructed by a hardware in the microcomputer COM.

[Step 3] The input data to the input ports PG0-PG3 are supplied to the register RGEv. The A/D converter ADC and the light measurement circuit $SPCOP_1$ are in operation by the supply of Vcc, and the light measurement information Ev converted to a 4-bit digital value by the A/D converter ADC is stored into the internal register RGEv.

[Step 4] The input ports PP0 and PP1 is checked to determine whether the shutter preferential mode has been set or not. If the selection knob 4 is positioned to the mark Tv to set the shutter preferential mode, the switch swSEL is on and this state is applied to the input ports PP0 and PP1 and detected. Then, the process proceeds to a step 5.

[Step 5] The content of the shutter information register RGTv which stores the information set by the dial 5 is substracted from the content of the register RGEv, and the difference (diaphragm information Av) is stored in the diaphragm information register RGAv. The contents of all registers in the microcomputer COM are held so long as the battery BAT is loaded. When the battery BAT is initially loaded, a value of high frequency of use, for example, 1/125 sec is initially set in the register RGAv.

[Step 6] The content of the register RGBR which stores the exposure step number information of the auto-bracket is stored into the diaphragm bracket step number register RGBA. The content of the shutter bracket step number register RGBT is set to zero (0).

[Step 7] The flag FABR is checked to determine if the auto-bracket mode has been set or not. If it has not been set, the flag FABR has not been set and the process proceeds to a step 8.

[Step 8] The flag FME is checked to determine if the multi-photograph mode has been set or not. If it has not been set, the flag FME has not been set and is "0", and the process proceeds to a step 9.

[Step 9] The flag FsAB which indicates if the auto-bracket switch swABR has been actuated or not is reset to "0". The flag FsME which indicates if the multi-photograph switch swME has been actuated or not is reset to "0".

[Step 10] The content of the diaphragm information register RGAV is supplied from the output port PFD, and the content of the shutter information register RGTv is supplied from the output port PTD. Thus, the calculated diaphragm value is displayed on the display SEG 5 and the preset shutter speed is displayed on the display SEG1.

[Step 11] The state of the input port PA1 is checked to determine if the second stroke of the shutter release button 1 has been depressed and the on signal of the second stroke switch sw2 has been supplied to the input port PA1. If the on signal of the second stroke switch sw2 has not been supplied, the process returns to the start. While the on signal of the first stroke switch sw1 is supplied, the routine comprising the above steps may be repeated so that the information is calculated based on the object brightness information, film sensitivity information and setting information, and the calculated information is displayed.

In the above routine, if the diaphragm preferential mode has been set instead of the shutter preferential mode, only one of the switches swSEL is on and the on states of both switches swSEL are not detected in the step 4. Thus, the process proceeds to a step 12 where the on state of one of the switches swSEL is detected. Then, the process proceeds to a step 13.

[Step 13] The content of the register RGAv which stores the information set by the dial 5 and the diaphragm setting switch swM is subtracted from the content of the register RGEv, and the difference is stored in the shutter information register RGTv. When the battery BAT is initially loaded, a value of high frequency of use, for example, F 5.6 is initially set in the register RGAv.

[Step 14] The content of the bracket step number register RGBR which stores the auto-bracket exposure step number information is stored in the shutter bracket step number register RGBT. The content of the diaphragm bracket step number register RGBA is set to zero.

In the diaphragm preferential mode, the steps 13 and 14 are carried out instead of the steps 5 and 6 of the shutter preferential mode. After the step 14, the same sequence as that for the shutter preferential mode is carried out, and the diaphragm value set in the step 10 is displayed on the display SEG5 and the calculated shutter speed is displayed on the display SEG1.

If the manual exposure mode is set while the above routine is carried out, both switches swSEL are off and the process proceeds to a step 15 through the steps 4 and 12.

[Step 15] The content of the register RGTM which stores the shutter speed information set by the dial 5 is stored into the shutter information register RGTv so that the information set by the dial 5 is stored as it is because the content of the register RGTv is changed for each photographing when the auto-bracket mode photographing is set in the manual exposure mode.

In the manual mode, the subsequent process is same as that in the diaphragm preferential mode, and the diaphragm value set in the step 10 is displayed on the display SEG5 and the shutter speed is displayed on the display SEG1.

The setting of information by the dial 5 during the operation of the light measurement timer is explained. If the depression (first stroke) of the shutter release button 1 is released during the above sequence, the off signal of the first stroke switch sw1 is produced in the step 1 and the process proceeds to a step 20 from the step 1.

[Step 20] The state of the input port PA9 is checked to determine the switch cover 6 has been opened or not. If it is closed, the switch swSET is off and the off signal of the switch swSET is applied to the input port PA9. Thus, the process proceeds to a step 21.

[Step 21] Whether the light measurement timer is in operation or not is checked. If it is immediately after the actuation of the light measurement timer in the step 2, the process proceeds to a step 22.

[Step 22] The states of the input ports PP0 and PP1 are checked to determine whether the shutter preferential mode has been set or not, as was done in the step 4. If it has been set, the process proceeds to a step 23.

[Step 23] The information read routine for the information set by the dial 5 is carried out. This routine is explained with reference to FIG. 6.

Figure 6:
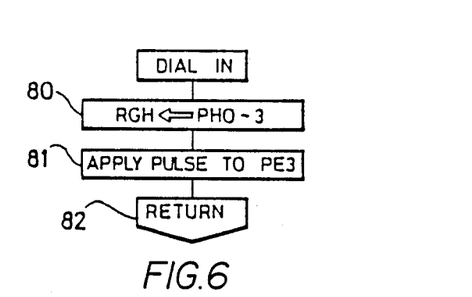
Figure 8:
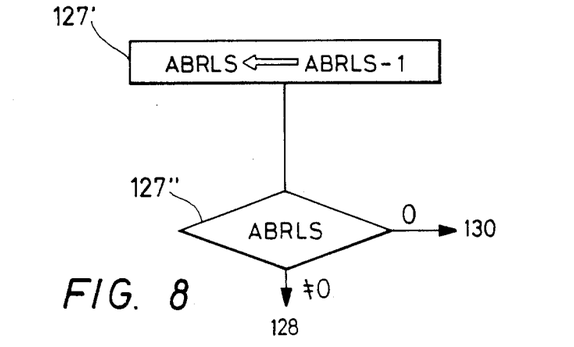

[Information read Routine]

[Step 80] The information to be applied to the input ports PH0–PH3 is stored into the dial register RGH. The value corresponding to the rotation of the dial 5 and the positive or negative information depending on the direction of rotation are generated in DIF and they are stored into the register RGH.

The register RGH stores the 4-bit information which indicates the number of shift-up or shift-down with respect to the current information.

[Step 81] The pulse signal at the output port PE3 is outputted. Thus, the content of the dial interface circuit DIF is reset to "0".

[Step 82] The process returns to the original step. Namely, it returns to the flow chart of FIGS. 5-1 and 5-2.

[Step 24] The value set by the dial (content of the register RGH) and the shutter information (content of the register RGTv) are added and the sum is stored into the shutter information register RGTv. The content of the shutter information register RGTv is stored into the register RGTM.

[Step 25] The shutter speed stored in the register RGTM is read and it is checked to determine whether it is a value (code) representing the bulb mode larger than a slowest shutter speed. If such a code is not stored, non-bulb mode is detected and the process proceeds to NEXT1 or the step 3.

In the Tv preferential mode, during the operation of the light measurement timer after the depression of the shutter release button 1 (first stroke) has been released, the setting information (Tv information) may be changed by the dial 5. Thereafter, the routine after the step 3 is carried out. Thus, in the step 10, the diaphragm value and the shutter speed are displayed on the displays SEG1 and SEG5, respectively.

If the diaphragm preferential mode has been set, the process proceed from the step 22 to the step 27 through the step 26.

[Step 27] The routine to read the information of the dial 5 is carried out, like the step 23.

[Step 28] The value set by the dial (content of the register RGH) and the diaphragm information (content of the register RGAv) are added, and the sum is stored into the diaphragm information register RGAv. In the diaphragm preferential mode, the process jumps to NEXT1 or the step 3, and in the step 10, the diaphragm value and the shutter speed are displayed on the displays SEG1 and SEG5, respectively, as are done in the shutter preferential mode.

If the manual exposure mode has been set, the process proceeds from the step 22 to the step 29 through the step 26.

[Step 29] The state of the input port PA8 is detected and the on/off state of the diaphragm setting switch swM is checked. In the manual exposure mode, the diaphragm may be changed by manipulating the diaphragm setting switch swM and the dial, and the shutter speed may be changed by manipulating only the dial. If the switch swM is on, the same routine (step 27) as that in the diaphragm preferential mode is carried out, and if the switch swM is off, the same routine (step 23) as that in the shutter preferential mode is carried out.

As the depression of the shutter release button 1 was released and the information was set by the dial 5 and a predetermined time has elapsed, the light measurement timer is timed out. Thus, the process proceeds from the step 21 to the step 30. Since the light measurement timer starts in the step 2, the light measurement timer is timed out if the switch sw1 is kept off for a predetermined time after the switch sw1 has been tuned off. This is detected in the step 21 and the process proceeds to a step 30.

[Step 30] The outputs of the output ports PTD, PFL, PABR, PME and PFD are rendered "0" to extinguish the displays on the displays SEG1–SEG5 (SEG2 not present). The output of the output port PF is rendered "0" to turn off the transistor $TR_{bat}$ to stop the supply of the power supply Vcc.

[Step 31] The flag FsAB which indicates whether the auto-bracket switch swABR as been actuated or not and the flag FsME which indicates whether the multi-photographing switch swME has been actuated or not are reset to "0", as were done in the step 9.

The process then jumps to the start point. Thus, after the light measurement time has been timed out, a standby mode of steps 1, 20, 21, 30 and 31 is repeated.

The operation in the auto-bracket mode is now explained. First, the operation when the switch cover 6 is opened to set the auto-bracket mode is explained. When the switch cover 6 is opened, the switch swSET is turned on and the on signal is supplied to the input port PA9. The on signal is detected in the step 20 and the process proceeds from the step 20 to the step 40.

[Step 40] The state of the input port PA11 is checked to determine the auto-bracket switch swABR. Since the switch cover 6 has just been opened and the auto-bracket switch swABR has not been actuated, the switch swABR is off and the process proceeds to a step 41.

[Step 41] The state of the input port PA10 is checked to determine if the multi-photograph switch swME is actuated. Since the multi-photograph switch swME has not been actuated, the process proceeds to a step 42.

[Step 42] The flag FsME which indicates whether the multi-photograph switch swME has been depressed or not is checked. In the initial load state of the battery BAT and the on state of the first stroke switch sw1, the flag FsME has been reset to "0" in the step 9. Thus, the process proceeds to a step 43.

[Step 43] The flag FsAB which indicates whether the auto-bracket switch swABR has been depressed or not is checked like in the step 9, since the flag sME has been reset to "0" in the step 9, the process jumps to the step 21.

When the switch cover 6 is opened and only the on signal of the switch swSET is applied, nothing is carried out.

The operation when the auto-bracket switch swABR has been depressed once after the above state is now explained. When the auto-bracket switch swABR is depressed, the on signal is applied to the input port PA11. This is detected in the step 40 and the process proceeds from the step 40 to a step 44.

[Step 44] Whether the content of the register RGTM indicates the bulb mode or not is checked. If it indicates the bulb mode, the process returns to the start point, and the auto-bracket mode is not initiated. If it does not indicate the bulb mode, the process proceeds to a step 45.

[Step 45] The flag FsAB which indicates that the auto-bracket switch swABR has been turned on is set to "1", and the flag FsME which indicates that the multi-photograph switch swME is on is reset to "0".

[Step 46] The outputs of the output ports PTD, PFL, PABR, PME and PFD are rendered "0" to extinguish the displays on the displays SEG1 to SEG5. Then, only the output of the output port PABR is rendered "1" and the auto-bracket mark of the display SEG3 is turned on. Thus, the operator can recognize that the auto-bracket mode has been set.

[Step 47] The flag FABR which indicates that auto-bracket mode has been set is set to "1".

[Step 48] The information read routine for the information set by the dial 5 is carried out as is done in the step 23 or 27. For example, if the step information 0.5 or 1 has been set by the dial 5 in the step 80, three preset auto-bracket mode photographic operations with the step numbers of "0.5, 0, 0.5" or "−1, 0, 1" are carried out. The photography with the step numbers of "−0.5, 0, 0.5" means three continuous photographic operations with −0.5 step under-exposure, with respect to a standard exposure calculated, the standard exposure, and 0.5 step over-exposure with respect to the standard exposure. The step number which can be set by the dial 5 in the auto-bracket mode is variable at an interval of 0.5 step.

[Step 49] The content of the bracket step number register RGBR and the content of the dial are added and the sum is stored into the register RGBR. A minimum unit of setting by one click of the dial 5 may be 0.5 step or one step. If the above unit differs from a minimum unit of the time value and the aperture value which can be set, a program may be inserted to cause the content of the register RGBR to be an integer multiple Since it is not pertinent to the present invention, detailed explanation thereof is omitted. The content of the register RGBR is outputted from the output port PFD and the step number information, for example "0.5" is displayed on the display SEG5. The decoder FD and the display SEG5 are also used to display the aperture value. Thus, a decoded content of the aperture value must be changed from Av of an APEX value to f-number, and a decoded content of the automatic bracket is a value in units of e.g., 0.5 steps and must also be changed. If the output from the output port PFD is of 5-bit signal, it can send 32 types of data. If the diaphragm values are F1.4–F32 with a pitch of 0.5 step, there are 14 data. If the auto-bracket indications are 0–5 with a pitch of 0.5 step, there are 11 data. Total of 30 data, or 31 data if a blank code is added, and the decoder FD can discriminate the information by adding a certain constant when the data is sent to the output port PFD. In this manner, the numerical display is attained.

[Step 50] The flag FME which indicates whether the multi-photograph mode has been set or not is checked. If the multi-photograph mode has not been set, the flag FME is "0" and the process returns to the start point. If the multi-photograph mode has been set, the flag FME is "1" and the process proceeds to a step 51.

[Step 51] The content of the multi-photograph count register RGME is set to "3". Since the number of times of auto-bracket mode photographing has been preset to "3", it is forcibly rendered "3" even if it is set otherwise to prevent misoperation of the operator and avoid a risk of wrong exposure. Then, the process returns to the start point. Once the on signal of the switch swABR has been entered, the process proceeds to the steps 40, 41, 42, 43 and 48 even if the off signal of the switch swABR is thereafter entered because the flag FsAB is set to "1" in the step 45. Thus, the auto-bracket step number change mode by the dial 5 is maintained and the operator can manipulate the dial 5 while he/she release the depression of the switch swABR.

The auto-bracket step number change mode may be released by turning on the first stroke switch sw1 or closing the switch cover 6 and turning off the switch swSET. When the on signal of the first stroke switch sw1 is entered, the process proceeds to the steps 1, 2, 3, ..., and the flag FsAB is reset to "0" in the step 9. The display is switched to normal display in the step 10. When the off signal of the switch swSET is applied, the process proceeds to the steps 20 and 21, and if the light measurement time has been timed out, the process further proceeds to the steps 30 and 31. In the step 30, the auto-bracket mark display is extinguished, and the flag FsAB is reset in the step 31. The process will no longer proceed to the auto-bracket step number change mode.

The exposure calculation in the auto-bracket mode is now explained. When the switch sw1 is turned on after the auto-bracket step number has been set into the register RGBR, the above routine (steps 1, 2, 3, ...) is carried out. If the shutter preferential mode is set in this routine, the content of the bracket step number register RGBR is stored in the diaphragm bracket step number register RGBA as described in the step 6, and if the shutter preferential mode or manual exposure mode is set, the content of the bracket step number register RGBR is stored in the shutter bracket step number register RGBT as described in the step 14. If the step 7 is carried out in the above routine, the process proceeds to a step 52 because it is in the auto-bracket mode and the flag FABR has been set to "1".

[Step 52] The content of the bracket step number register RGBR is checked. If it is "0", the photographing is carried out three times with the same exposure (standard exposure in the present embodiment). Since it is nonsense, the auto-bracket mode photographing should be inhibited. In this case, the process proceeds to a step 53.

[Step 53] The flag FABR which indicates the auto-bracket mode is reset to "0". The output of the output port PABR is rendered "0" to extinguish the auto-bracket mark display.

Then, the process proceeds to the step 8 so that the auto-bracket exposure calculation is not carried out, and the flag FsAB is reset to "0" to carry out the normal routine.

In the step 52, if the content of the bracket step number register RGBR is not "0", the exposure calculation and the auto-bracket mark display are to be carried out based on the step number information. Thus, the process proceeds to a step 54.

[Step 54] The output of the output port PABR is rendered "1" to display the auto-bracket mark. When the switch swSET is turned off by closing the switch cover 6 from the auto-bracket mode setting state, the display is extinguished in the step 30. Thus, when the stroke switch sw1 is turned on the display must be again turned on.

[Step 55] The state of the first stroke switch sw1 is checked as was done in the step 1. If it is on, the process proceeds to a step 56.

[Step 56] The content of the diaphragm information register PGAv and the content of the diaphragm bracket step number register RGBA are added and the sum is stored into the register RGAv. The content of the shutter information register RGTv and the content of the shutter bracket step number register RGBT are added and the sum is stored into the register RGTv. This means that the calculated diaphragm information is changed in the shutter preferential mode and the calculated shutter speed information is changed in the diaphragm preferential mode, in accordance with the auto-bracket step number. If the auto-bracket step number is set so that it is not negative at the step 49, the calculated value in the step 56 is an under-exposure value with respect to the standard exposure. In the manual exposure mode, since the step 14 similar to the step in the diaphragm preferential mode is carried out, the shutter speed is changed and the diaphragm is not changed as is done in the conventional camera. Accordingly, the auto-bracket photographing with constant object field depth and variable exposure is attained.

If the off state of the first stroke switch sw1 is detected in the step 55, the exposure calculation in the step 56 is not carried out because the light measurement timer is in operation, and the standard exposure is displayed in the step 10. In this case, since the first stroke of the shutter release button 1 is depressed, the step 56 is carried out and the auto-bracket mode photographing is not affected.

In the auto-bracket mode, when the first stroke switch sw1 is on, the exposure under the auto-bracket mode, that is, the under-exposure in the present embodiment is displayed, and during the operation of the light measurement timer, the standard exposure is displayed. Thus, the operator can readily recognize the auto-bracket exposure.

The operation when the bulb mode is set by the dial after the auto-bracket mode has been set is explained. Since the bracket mode photographing with the bulb mode does not make sense, it is effective to release the auto-bracket mode. Thus, if the bulb mode is detected in te step 25, the process proceeds to the step 57. After the auto-bracket mode has been set, the information is set by the dial in the steps 1, 20–25, and the content of the register RGTM is set to a value which represents the bulb mode. Then, the process proceeds to the step 57.

[Step 57] The output of the output port PABR is rendered "0" to extinguish the display of the auto-bracket mark. The auto-bracket mode flag FABR is reset to "0". Thus, if the bulb mode is set in the auto-bracket mode, the auto-bracket mode is cancelled.

The operation in the multi-photograph mode is now explained. As the switch cover 6 is opened and the switch swME is actuated when the routine of the steps 20 and 40 is executed and the on signal of the switch is applied, the process proceeds from the step 41 to a step 60.

[Step 60] The flag FsME which indicates that the multi-photograph switch swME has been turned on is set to "1". The flag FsAB which indicates that the auto-bracket switch swABR has been turned on is reset to "0".

[Step 61] The outputs of the output ports PTD, PFL, PABR, PME and PFD are rendered "0" to extinguish all displays. Then, only the output of the output port PME is rendered "1" and the multi-photograph mode mark is displayed on the display SEG4.

[Step 62] The flag FME indicating the multi-photograph mode is set to "1".

[Step 63] The auto-bracket mode is checked. If it is the auto-bracket mode, the process proceeds to a step 64.

[Step 64] Since it is the auto-bracket mode, the number of times of multi-photographing is forcibly set to three as was done in the step 51, that is, the content of the multi-photograph count register RGME is set to "3".

If the auto-bracket mode has not been set in the step 63, the process proceeds to a step 65.

[Step 65] The information read routine for the information set by the dial is carried out, as was done in the step 48.

[Step 66] The content of the multi-photograph count register RGME and the content of the dial register RGH are added, and the sum is stored into the register RGME. Since the multi-photograph count is an integer, if a resolution of one click of the dial 5 is 0.5 step, the content of the dial register RGH is doubled before the addition. It is necessary to the design that the content of the register RGH does not assume a negative value, although the explanation thereof is omitted.

[Step 67] The content of the multi-photograph count register RGME is outputted from the output port PFD and displayed on the display SEH5.

Then, the process returns to the start point. Once the on signal of the switch swME is applied, the flag FsME is set to "1" in the step 60. Thus, even if the off signal of the switch is subsequently applied, the process proceeds to the steps 41, 42 and 63 so that the multi-photograph count setting mode is maintained. In order to shift the mode from the auto-bracket step number change mode to the multi-photograph setting mode, the switch swME is turned on once. For the reverse shift, the switch swABR is turned on once as is seen from the flow chart of FIGS. 5-1 and 5-2.

If the multi-photograph count is once set and then the multi-photograph count is set to zero in the above routine, it is necessary to release the multi-photograph mode and extinguish the multi-photograph mark. Since the flag FME has been set to "1" in the step 8, the process proceeds to a step 68. Namely, when the multi-photograph mode is set, the flag FME is "1". Thereafter, the switch sw1 is turned on and the routine of the steps 1, 2, . . . is carried out. In the step 8, the set state of the flag FME is detected and the process proceeds to the step 68.

[Step 68] If the content of the multi-photograph count register RGME is zero, the process proceeds to a step 69.

[Step 69] The flag which indicates the multi-photograph mode is reset to "0". The output of the output port PME is rendered "0" to extinguish the display of the multi-photograph mark.

If the content of the multi-photograph count register RGME is not zero in the step 68, the process proceeds to a step 70.

[Step 70] The output of the output port PME is rendered "1" to display the multi-photograph mark. Since all displays have been extinguished in the step 30, the multi-photograph mode is informed to the operator when the first stroke of the shutter release button 1 is again actuated.

In this manner, the preparation stage for photographing is completed.

Figure 71:
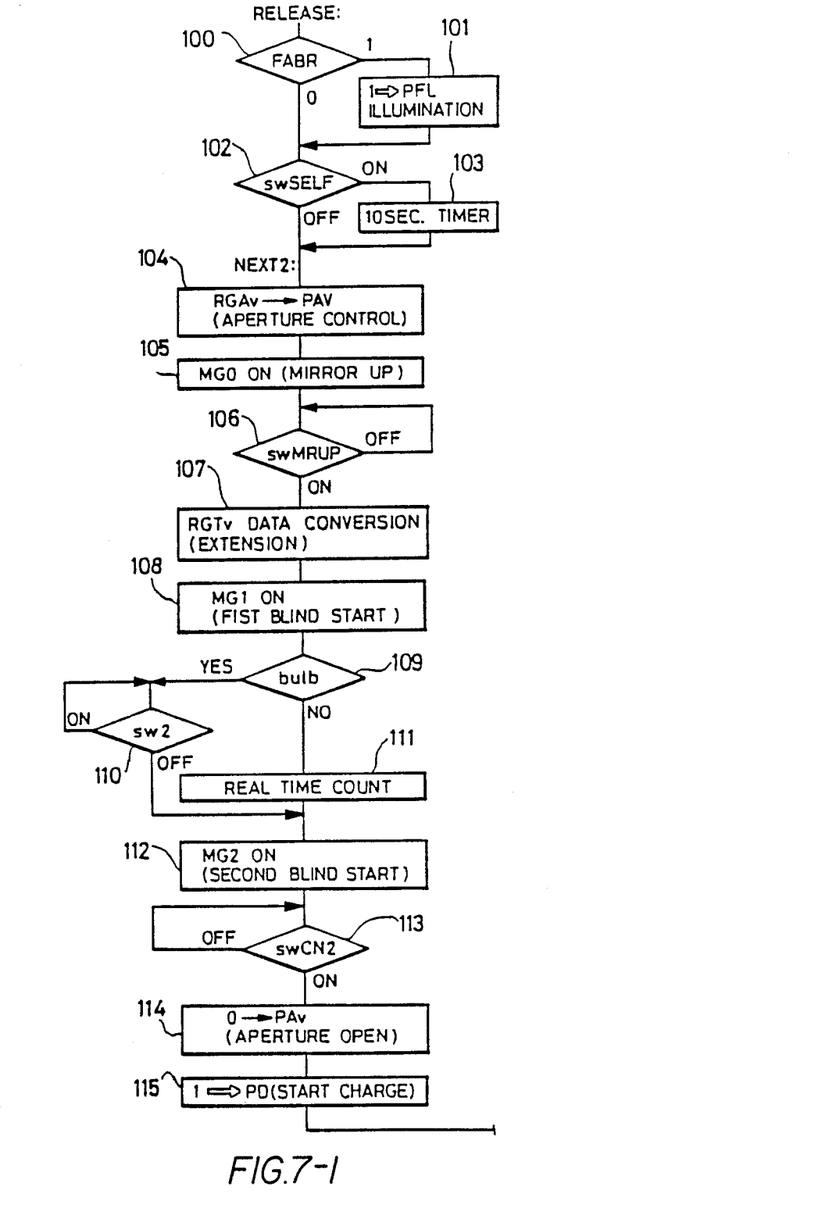

The sequence after the second stroke of the shutter release button 1 has been actuated is now explained. When the second stroke of the shutter release button 1 is actuated and the on signal (release signal) of the second stroke switch SW2 is applied to the input port PA1, the process proceeds from the step 11 of FIG. 5-1 to a step 100 of FIG. 7-1.

[Step 100] The state of the flag FABR is checked to determine whether the auto-bracket mode has been set or not. If it has been set, the process proceeds to a step 101, and if it has not been set, the process proceeds to a step 102.

[Step 101] The output of the output port PFL is rendered "1" and the auto-bracket mark on the display SEG2 is blinked. Thus, the operator can recognize that the auto-bracket mode photographing has been started.

[Step 102] The state of the input port PA6 is checked to determine whether the on signal of the self-switch SELF has been applied or not. In the self-timer mode, the switch SW SELF is on and the on signal is applied. Thus, the process proceeds to a step 103. If the self-timer mode has not been set, the process proceeds to a step 104.

[Step 103] 10 seconds are counted by the self-timer.

[104] The content of the diaphragm information register RGAv is outputted from the output port PAV. Thus, the diaphragm control drive circuit DAV converts the content of the register RGAv to a real diaphragm information and starts the diaphragm control through a diaphragm driving actuator CAV such as a stepping motor.

[Step 105] A pulse signal is outputted from the output port PEO to turn on the transistor TRO to energize a mirror move-up magnet MGO. Thus, the mirror is moved up by a spring force.

[Step 106] The state of the input port PA2 is checked to determine whether the on signal of the switch SW MRUP which detects the end of the mirror move-up has been applied or not. This loop is repeated until the on signal is applied, that is, until the mirror is fully moved up, when the switch SW MRUP is turned on, and the process proceeds to a step 107.

[Step 107] The content of the shutter information register RGTv (apex value) is converted (expanded) to real time data.

[Step 108] A pulse signal is outputted from the output port PEI to turn on the transistor TR1 to energize the shutter leading curtain magnet MG1. Thus, the shutter leading curtain is driven.

[Step 109] The content of the register RGTM is checked. If it is the bulb mode, the process proceeds to a step 110, and if it is not the bulb mode, the process proceeds to a step 111.

[Step 110] The state of the input port PA1 is checked and the input of the off signal of the second stroke switch SW2 is monitored. Since it is the bulb mode, the shutter must be kept open while the on signal of the second stroke switch SW2 is applied.

[Step 111] Since it is not the bulb mode, real-time counting by the data expanded in the step 107 is carried out and the calculated shutter time is counted.

[Step 112] At the end of the real-time counting, the pulse signal is outputted from the output port PE2 to turn on the transistor TR2 to energize the shutter trailing curtain magnet MG2. Thus, the shutter trailing curtain is driven.

[Step 113] The state of the input port PA5 is checked to determine whether the on signal of the shutter trailing curtain switch SW CN2 has been applied or not. This loop is repeated until the drive of the shutter trailing curtain is completed and the on signal of the switch SW CN2 is applied, that is, until the movement of the shutter trailing curtain is completed, when the process proceeds to a step 114.

[Step 114] The output of the output port PAV is rendered "0". Thus, the diaphragm returns to the open state.

[Step 115] The output of the output port PD is rendered "1" to turn on the transistor TR3 to energize the charge motor for moving down the mirror and charging the shutter.

[Step 116] The state of the flag FME is checked to determine whether the multi-photograph mode has been set or not. If it has been set, the process proceeds to a step 117, and if it has not been set, the process proceeds to a step 120.

[Step 117] The content of the multi-photograph count register RGME is decremented by one and the difference is stored into the register RGME.

[Step 118] The content of the multi-photograph count register RGME is checked. If it is "0", the process proceeds to a step 119, and if it is not "0", the process proceeds to a step 121.

[Step 119] If the content of the multi-photograph register RGME is "0", it means the end of the multi-photographing. Thus, the flag FME which indicates the multi-photograph mode is reset to "0". The output of the output port PME is rendered "0" is extinguish the multi-photograph mark display.

[Step 120] The film feed timer is started. The output of the output port PB is rendered "1" to turn or the transistor TR5 to energize the film feed motor MB. If the multi-photograph mode continues, the content of the multi-photograph count register RGME is not zero. Thus, the process proceeds from the step 118 to a step 121 and does not pass through the step 120. Accordingly, the film is not fed and multi-photographing is carried out. At the end of the multi-photographing, the content of the register RGME is zero. Accordingly, the film is fed in the step 120 after the multi-photograph mode has been released.

[Step 121] The state of the input port PA3 is checked to determine whether the on signal of the end of charge detection switch SW CGE has been applied or not. Since the switch SW CGE is turned on at the end of charging, if the on signal is not applied or the charging has not been completed, the process proceeds to a step 123, and when the charging is completed, the process proceeds to a step 122.

[Step 122] Since the charge has been completed, the output of the output port PD is rendered "0" to energize the charging motor MD.

[Step 123] The state of the input port PA4 is checked to determine whether the on signal of the switch SW FLM which is turned on at the end of one-frame feed of the film has been applied or not. If it has not been applied, that is, if the one-frame feed of the film has not been completed, the process proceeds to a step 124, and if it has been completed, the process proceeds to a step 125.

[Step 124] The state of the film feed timer is checked. If the film is exhausted, the film is no longer fed and the switch SW FLM is not turned on. In such a case, the film feed timer which is a one-second timer is timed out during the feeding. When it is timed out, the process proceeds to a step 150, and if it is not timed out, the process returns to the step 121 where the above sequence (step 121, 123) is repeated.

[Step 125] If the application of the off signal of the switch SW FLM is detected in the step 123, the output of the output port PB is rendered "0" to turn off the transistor TR5 to stop the film feed motor MB. Since the charge time of the charge system is shorter than the feed time, the charge motor is stopped in the step 122 before the end of feed is detected in the step 123.

Figure 72:
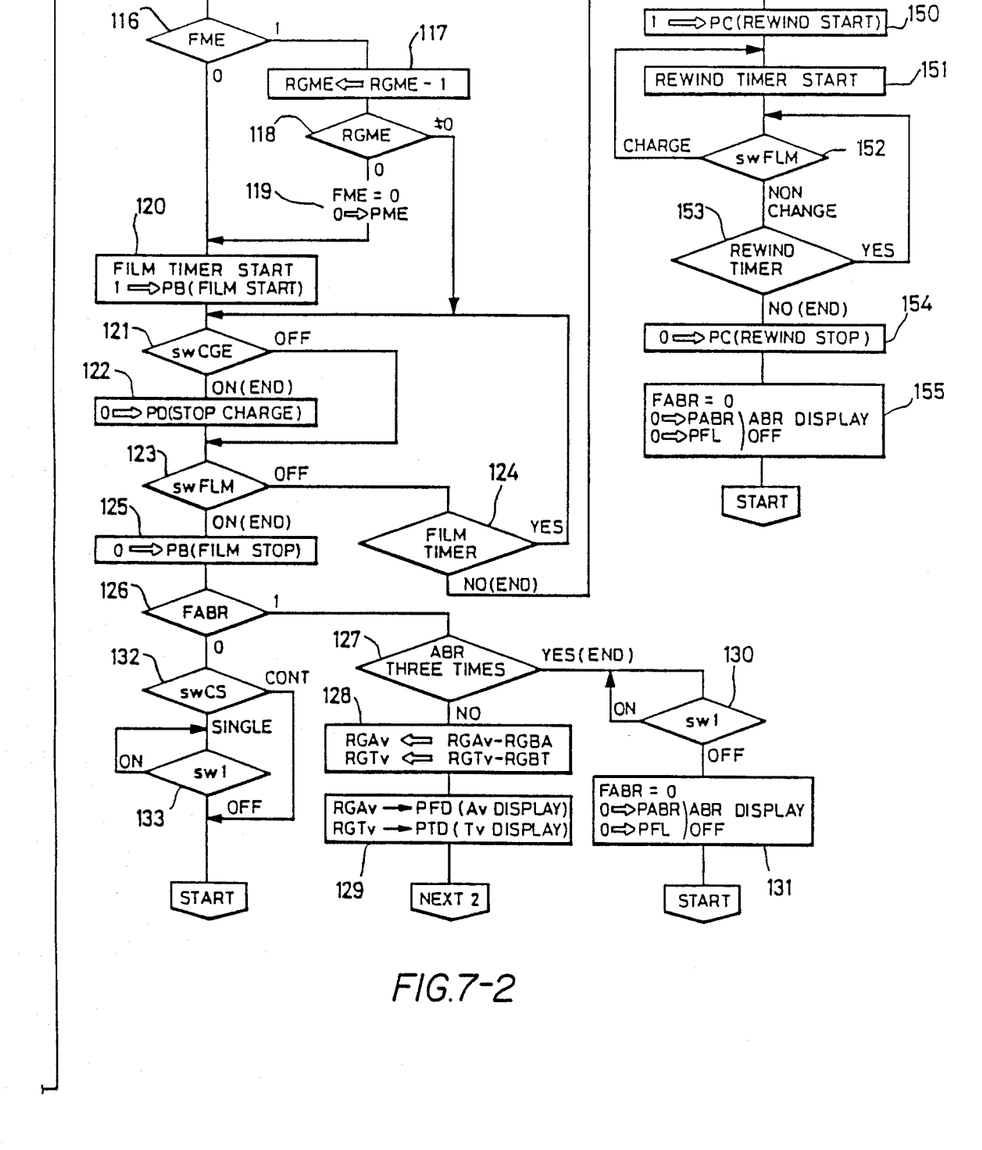

[Step 126] The state of the flag FABR is checked to determine whether the auto-bracket mode has been set or not. If it has not been set, the process proceeds to a step 132, and if it has been set, the process proceeds to a step 127.

[Step 127] The number of times of the auto-bracket mode photographing is checked. Since the auto-bracket mode continuously photographs at three exposures, that is, underexposure, standard and overexposure, if the photographing is not completed in three times, the process proceeds to a step 128. The step 127 is divided into substeps 127' and 127". In the substep 127', the content of the register ABRLS is decremented by one and the reset is stored into the register ABRLS. In the substep 127", if the content of the register ABRLS is not "0", the process proceeds to the step 128, and if it is "0", the process proceeds to a step 130. When the power is turned on by the actuation of the switch SWI, the initial value "3" is set into the register ABRLS. Thus, the auto-bracket mode photographing is carried out three times continuously.

[Step 128] The content of the diaphragm bracket step number register GRBA is subtracted from the content of the diaphragm information register RGAv and the difference is stored into the register RGAv. The content of the shutter bracket step number register GRBT is subtracted from the content of the shutter speed information register RGTv and the difference is stored into the register RGTv. The same program may be used in the shutter preferential mode, diaphragm preferential mode and manual exposure mode, as was done in the step 56 of FIG. 5-2 because the contents of the registers RGBA and RGBT were changed in the steps 6 and 14. It is apparent from the operation, (subtraction formula) that the second photographing operation is of standard exposure and the third photographing is operation of overexposure.

[Step 129] The contents of the registers RGAv and RGTv are outputted from the output ports PFD and PTD to display the shutter speed information and diaphragm information.

The process then jumps to NEXT2 or the step 104. Namely, the next photograhping operation is started irrespective of the on/off state of the second stroke switch SW2 (whether or not the release signal has been issued). Even if the photographing operation is carried out in the self-timer mode, the second and third photographing operations are not carried out in the self-timer mode.

[Step 130] The state of the first stroke switch SWI is checked to determine whether the off signal has been applied or not. If it has not been applied, the display calculated in the steps 128 and 129 is viewable. In other word, the final overexposure value is confirmed. The first underexposure value is viewable in the display step 55. Thus, all the underexposure, standard and overexposure values in the auto-bracket mode photographing operation can be confirmed during the photographing sequence. When the off signal of the first stroke switch SW1 is applied. The process proceeds to a step 131.

[Step 131] The flag FABR which indicates the auto-bracket mode is reset to "0". The output of the output port PEL is rendered "0" to extinguish the blinking of the auto-bracket mark.

Then, the process returns to the start point to enter the stand-by mode.

The operation in the non-auto-bracket mode is explained. Since the flag FABR is "0", the process proceeds from the step 126 to a step 132.

[Step 132] The on/off state of the switch SW CS connected to the input port PA7 is checked to determine the continuous photographing mode or single photographing mode. If it is the continuous photographing mode, the process returns to the start point. Since the shutter release button 1 has been depressed and the on signals of the first and second stroke switches SW1 and SW2 have been applied, the next photographing operation is started. In the single photographing mode, the process proceeds to a step 133.

[Step 133] The application of the off signal of the first stroke switch SW1 is monitored. In the single photographing mode, the next photographing sequence is not started unless the operator releases the depression of the shutter release button 1. When the off signal is applied, the process returns to the start point.

The operation when the film is exhausted in the course of photographing is explained. Since the film timer which may be a one-second timer is timed out, the process proceeds from the step 124 to the step 150.

[Step 150] The output of the output port PC is rendered "1" to turn on the transistor TR4 to energize the rewind motor MC. Thus, the rewinding of the film is started.

[Step 151] The rewind timer is started to determine whether the rewinding of the film is completed or not.

[Step 152] The state of the film switch SW FLM is checked. If it has been changed, the process returns to the step 151 to restart the rewind timer. If it has been changed, the process proceeds to a step 153.

[Step 153] The time-out of the rewind timer is checked. If it has not been timed out, the process returns to the step 152.

As seen from the above, the loop of the steps 152 and 153 is carried out during the one-frame feed, and at the end of the one-frame feed, the process returns from the step 152 to the step 151. This loop is repeated during the film rewinding. When the entire film has been taken up into film cartridge, the film cartridge stops to rotate and the change of state of the film switch SW FLM stops. Thus, the rewind timer is timed out and this is detected in the step 153. The process then proceeds to a step 154.

[Step 154] The output of the output port PC is rendered "0" to turn off the transistor TR4 to stop the rewind motor MC. Thus, the rewinding of the film is terminated.

[Step 155] The flag FABR which indicates the auto-bracket mode is reset to "0". The output of the output port PEL is rendered "0" to extinguish the blinking of the auto-bracket mark.

Then, the process returns to the start point.

If the film is exhausted in the course of the auto-bracket mode photographing operation which instructs three continuous photographing operations, the routine starting from the step 150 is initiated in the first or second frame. In such a case, if the auto-bracket mode photographing operation continues for a newly loaded film, the object may have been changed or the operator may be confused. Accordingly, it is advisable to inform it to the operator and release the auto-bracket mode. This is shown in a flow chart of FIG. 7-1 and 7-2. If the film is exhausted after the blinking of the auto-bracket mark has been done in the step 101, the film rewinding is automatically started. During the film rewinding, the blinking of the auto-bracket mark is not released. Accordingly, the auto-bracket mark which would not be normally displayed is displayed during the film rewinding. Thus, the operator recognize that the film has been exhausted before the completion of the auto-bracket mode photographing. It is an alarm display. Since the flag FABR which indicates the auto-bracket mode is reset to "0" in the step 155, the auto-bracket mode photographing is not continued for the newly loaded film.

As has been described above, according to the present invention, shutter and aperture information can be set by a single setting operation member when manual information is set, thereby improving its operability.

I claim:

1. An information setting device for a camera, comprising:
   (a) a mode setting operation member for setting a manual mode;
   (b) a first operation member;
   (c) an information setting operation
   (d) an information setting circuit, said information setting circuit setting, when the manual mode is set by said mode setting operation member, one of time value and aperture value information in response to the operation of said information setting operation member while said first operation member is in an operative state, and wherein said information setting circuit sets the other of the time value and aperture value information, in response to the operation of said information setting operation member while said first operation member is in an inoperative state.

2. A device according to claim 1, wherein said information setting circuit has first and second memory circuits and a designation circuit for designating, when the manual mode is set by said mode setting operation member and in response to an operation state of said first operation member, said first memory circuit while said first operation member is in an operative state, and for designating said second memory circuit while said first operation member is in an inoperative state, and wherein said device further comprises an information circuit for forming an information value by operating said information setting operation member, and wherein the information value from said information circuit is supplied to said memory circuit designated by said designation circuit.

3. A device according to claim 2, wherein said information circuit has a counter for updating the count value by operating said information setting operation member, and supplies the content of said counter to said memory circuits.

4. A device according to claim 2, wherein said information setting operation member sets an aperture-priority mode and a shutter-priority mode in addition to the manual mode, said designation circuit designates said first memory circuit when the aperture-priority mode is set by said mode setting operation member and designates said second memory circuit when the shutter-priority mode is set by said mode setting operation member, and wherein information is supplied from said information setting circuit to said memory circuit designated by said designation circuit in the respective priority modes.

5. A device according to claims 1 or 2, wherein said information setting operation member has a dial shape and said first operation member has a push button shape.

6. An information setting device for a camera, comprising:
   (a) a mode setting operation first member for selectively setting a manual-mode or an auto-mode in which exposure amounts are controlled on the basis of preset information or the output of a photometering circuit;
   (b) an information setting operation second member for setting the preset information in the auto-mode;
   (c) an information setting circuit for setting the preset information in the auto-mode in accordance with the operation of said information setting operation member when the auto-mode is selected by said mode setting operation member;
   (d) a third operation member;
   (e) a manual-mode information setting circuit which causes said information setting circuit to set one of a shutter speed and an aperture value in accordance with the operation of said information setting operation member when the manual-mode is selected by said mode setting operation member, and said third operation member is not in an operational state and wherein said manual-mode information setting circuit causes said information setting circuit to set the other of the shutter speed and the aperture value when the manual-mode is selected and said third operation member is in an operational state.

7. An information setting device for a camera, comprising:
   (a) a housing portion comprising:
       a cover; and
       a built-in first operation member for setting a special-mode by generating a special mode signal when said first operation member is in an operational state, wherein the generation of the special mode signal is cancelled when the operational state of said first operation member is cancelled;
   (b) a latch-circuit for latching the special mode signal;
   (c) an information setting operation member provided outside of said housing portion, for generating photographing information;
   (d) a first memory circuit for memorizing preset information relating to a shutter speed and an aperture value to control the exposure;
   (e) a second memory circuit for memorizing information relating to the special mode;
   (f) a selection circuit which selects said second memory circuit to receive the information generated by the operation of said information setting operation member when said latch circuit is in a latch state for latching the said special mode signal and which selects said first memory circuit to receive the information generated by the operation of said information setting operation member when said latch circuit is not in the latch state for latching said special mode signal; and
   (g) an outside operation member provided outside of said housing portion, for canceling the special mode signal latched by said latch circuit.

8. An information setting device according to claim 7, wherein said outside operation member is a release operation member.

9. An information setting device for a camera, comprising:
   (a) a housing portion comprising:
       a cover; and
       a built-in first operation member for setting a special-mode by generating a special mode signal when said first operation member is in an operational state, wherein the generation of the special mode signal is cancelled when the operational state of said first operation member is cancelled;
   (b) a latch-circuit for latching the special mode signal;
   (c) an information setting operation member provided outside of said housing portion, for generating photographing information;
   (d) a first memory circuit for memorizing preset information relating to a shutter speed and an aperture value to control the exposure;
   (e) a second memory circuit for memorizing information relating to the special mode;
   (f) a selection circuit which selects said second memory circuit to receive the information generated by the operation of said information setting operation member when said latch circuit is in a latch state for latching the said special mode signal and which selects said first memory circuit to receive the information generated by the operation of said information setting operation member when said latch circuit is not in the latch state for latching said special mode signal; and
   (g) a reset member for canceling the special mode signal latched by said latch-circuit in response to the shutting of said cover member.

* * * * *

UNITED STATES PATENT AND TRADEMARK OFFICE
CERTIFICATE OF CORRECTION

PATENT NO. : 4,837,596
DATED : June 6, 1989
INVENTOR(S) : Masaharu Kawamura

It is certified that error appears in the above-identified patent and that said Letters Patent is hereby corrected as shown below: On the title page:

AT [30] Foreign Application Priority Data:

"Aug. 1, 1986 [JP]  Japan ... 179855"
should read
--Aug. 1, 1986 [JP]  Japan ... 61-179855--.

FIG. 5-3 (Sheet 5 of 7):

Block 61, "(DISLAY)" should read --(DISPLAY)--.

FIG. 7-1 (Sheet 6 of 7):

Block 108, "(FIST BLIND START)" should read --(FIRST BLIND START)--.

UNITED STATES PATENT AND TRADEMARK OFFICE
CERTIFICATE OF CORRECTION

PATENT NO. : 4,837,596

DATED : June 6, 1989

INVENTOR(S) : Masaharu Kawamura

It is certified that error appears in the above-identified patent and that said Letters Patent is hereby corrected as shown below:

COLUMN 6:

Line 4, "is same" should read --is the same--.

Line 16, "determine" should read --determine whether--.

COLUMN 7:

Line 45, "as" should read --has--.

COLUMN 8:

Line 9, "flag sME" should read --flag FsME--.

Line 62, "ple" should read --ple.--.

COLUMN 10:

Line 66, "te" should read --the--.

UNITED STATES PATENT AND TRADEMARK OFFICE
CERTIFICATE OF CORRECTION

PATENT NO. : 4,837,596　　　　　　　　　　Page 3 of 3
DATED : June 6, 1989
INVENTOR(S) : Masaharu Kawamura It is certified that error appears in the above-identified patent and that said Letters Patent is hereby corrected as shown below:

COLUMN 14:

Line 57, "and-the" should read --and the--.

COLUMN 16:

Line 51, "operation" should read --operation member; and--.

Signed and Sealed this

Fourteenth Day of August, 1990

Attest:

HARRY F. MANBECK, JR.

Attesting Officer　　　　　　Commissioner of Patents and Trademarks